US012760858B2

(12) United States Patent
Soeta et al.

(10) Patent No.: US 12,760,858 B2

(45) Date of Patent: Oct. 13, 2026

(54) VEHICULAR LAMP

(71) Applicant: HONDA MOTOR CO., LTD., Tokyo (JP)

(72) Inventors: Ryuhei Soeta, Tokyo (JP); Hirotsugu Shiina, Wako (JP); Hiroki Yoshitomi, Wako (JP); Eiji Ashihara, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/148,138

(22) PCT Filed: Jan. 12, 2024

(86) PCT No.: PCT/JP2024/000707

§ 371 (c)(1),
(2) Date: Jul. 15, 2025

(87) PCT Pub. No.: WO2024/161955

PCT Pub. Date: Aug. 8, 2024

(65) Prior Publication Data

US 2026/0227046 A1 Aug. 6, 2026

(30) Foreign Application Priority Data

Jan. 31, 2023 (JP) ................................ 2023-012800

(51) Int. Cl.
*F21S 43/20* (2018.01)
*F21S 43/14* (2018.01)
(Continued)

(52) U.S. Cl.
CPC ............ *F21S 43/14* (2018.01); *F21S 43/255* (2018.01); *F21S 43/26241* (2024.05);
(Continued)

(58) Field of Classification Search
CPC .... F21S 43/26411; F21S 43/331; F21S 43/40; F21S 43/401
See application file for complete search history.

(56) References Cited

U.S. PATENT DOCUMENTS

2009/0027911 A1* 1/2009 Misawa ............... F21S 43/243 362/545
2016/0312972 A1 10/2016 Izawa

FOREIGN PATENT DOCUMENTS

JP S56-104006 U 8/1981
JP 2004-193026 A 7/2004
(Continued)

OTHER PUBLICATIONS

International Preliminary Report on Patentability for Corresponding International Application No. PCT/JP2024/000707, dated Sep. 5, 2024, 8 pages.
(Continued)

*Primary Examiner* — Sean P Gramling
(74) *Attorney, Agent, or Firm* — Rankin, Hill & Clark LLP

(57) ABSTRACT

Provided is a vehicular lamp capable of being expected to improve design quality while preventing an increase in costs.
In a vehicular lamp including a light source and an outer lens that transmits and reflects light emitted from the light source, the outer lens includes a first outer lens surface that extends in an up-down direction of the vehicular lamp, and a second outer lens surface that extends in a front-rear direction of the vehicular lamp; the second outer lens surface is located above the light source and the first outer lens surface, and is located either in front of or behind the light source and the first outer lens surface; and the second outer lens surface is provided in a step shape.

6 Claims, 9 Drawing Sheets

(51) Int. Cl.

| | |
|---|---|
| ***F21S 43/31*** | (2018.01) |
| ***F21S 43/40*** | (2018.01) |
| *F21W 103/35* | (2018.01) |
| *F21W 107/17* | (2018.01) |

(52) U.S. Cl.

CPC ......... *F21S 43/26411* (2024.05); *F21S 43/31* (2018.01); *F21S 43/40* (2018.01); *F21W 2103/35* (2018.01); *F21W 2107/17* (2018.01)

(56) References Cited

FOREIGN PATENT DOCUMENTS

| | | | |
|---|---|---|---|
| JP | 2006-131084 | A | 5/2006 |
| JP | 2011-121510 | A | 6/2011 |
| JP | 2016-207470 | A | 12/2016 |
| JP | 2018-56039 | A | 4/2018 |

OTHER PUBLICATIONS

International Search Report for Corresponding International Application No. PCT/JP2024/000707, dated Mar. 26, 2024, 4 pages.

International Preliminary Report on Patentability Corresponding to International Application No. PCT/JP2024/000707, dated Jul. 31, 2025, 4 pages.

* cited by examiner

VEHICULAR LAMP

TECHNICAL FIELD

The present invention relates to a vehicular lamp.

BACKGROUND ART

Conventionally, a vehicular lamp has been known in which a light-transmitting member is disposed in front of a light source and a thickness of the light-transmitting member is made not to be excessively thick in part, whereby light from the light source can be emitted forward from the light-transmitting member with high accuracy (for example, see Patent Literature 1).

In addition, for example, a vehicular lamp has been known which efficiently utilizes light emission from an LED and includes an inner lens for a vehicle lamp having excellent design properties (for example, see, Patent Literature 2).

All of these vehicular lamps include a step shape, whereby the light emitted from the light source is reflected by the step shape and emitted in a front-rear direction of a vehicle.

CITATION LIST

Patent Literature

Patent Literature 1: Japanese Patent Laid-Open No. 2016-207470

Patent Literature 2: Japanese Patent Laid-Open No. 2004-193026

SUMMARY OF INVENTION

Technical Problem

Incidentally, some vehicular lamps are configured in which light-blocking paint is applied to a lens and thus a light-emitting surface is partially prevented from emitting light.

In these vehicular lamps, however, costs may be increased due to an application with paint.

The present invention provides a vehicular lamp that is expected to improve design quality while preventing an increase in costs.

Solution to Problem

The present application incorporates the disclosure of Japanese Patent Application No. 2023-012800, filed on Jan. 31, 2023 in its entirety.

A vehicular lamp is a vehicular lamp including: a light source; and an outer lens that transmits and reflects light emitted from the light source, in which: the outer lens includes a first outer lens surface that extends in an up-down direction of the vehicular lamp, and a second outer lens surface that extends in a front-rear direction of the vehicular lamp; the second outer lens surface is located on an upper side relative to the light source and the first outer lens surface, and is located either on a front side or a rear side relative to the light source and the first outer lens surface; and the second outer lens surface is provided in a step shape.

Advantageous Effects of Invention

It is expected to improve design quality while preventing an increase in costs.

BRIEF DESCRIPTION OF DRAWINGS

FIG. 7 is a rear view of the tail light unit in which the first LED is being turned on.

FIG. 9 is a rear view of the tail light unit in which the second LED is being turned on.

DESCRIPTION OF EMBODIMENTS

Figure 1:
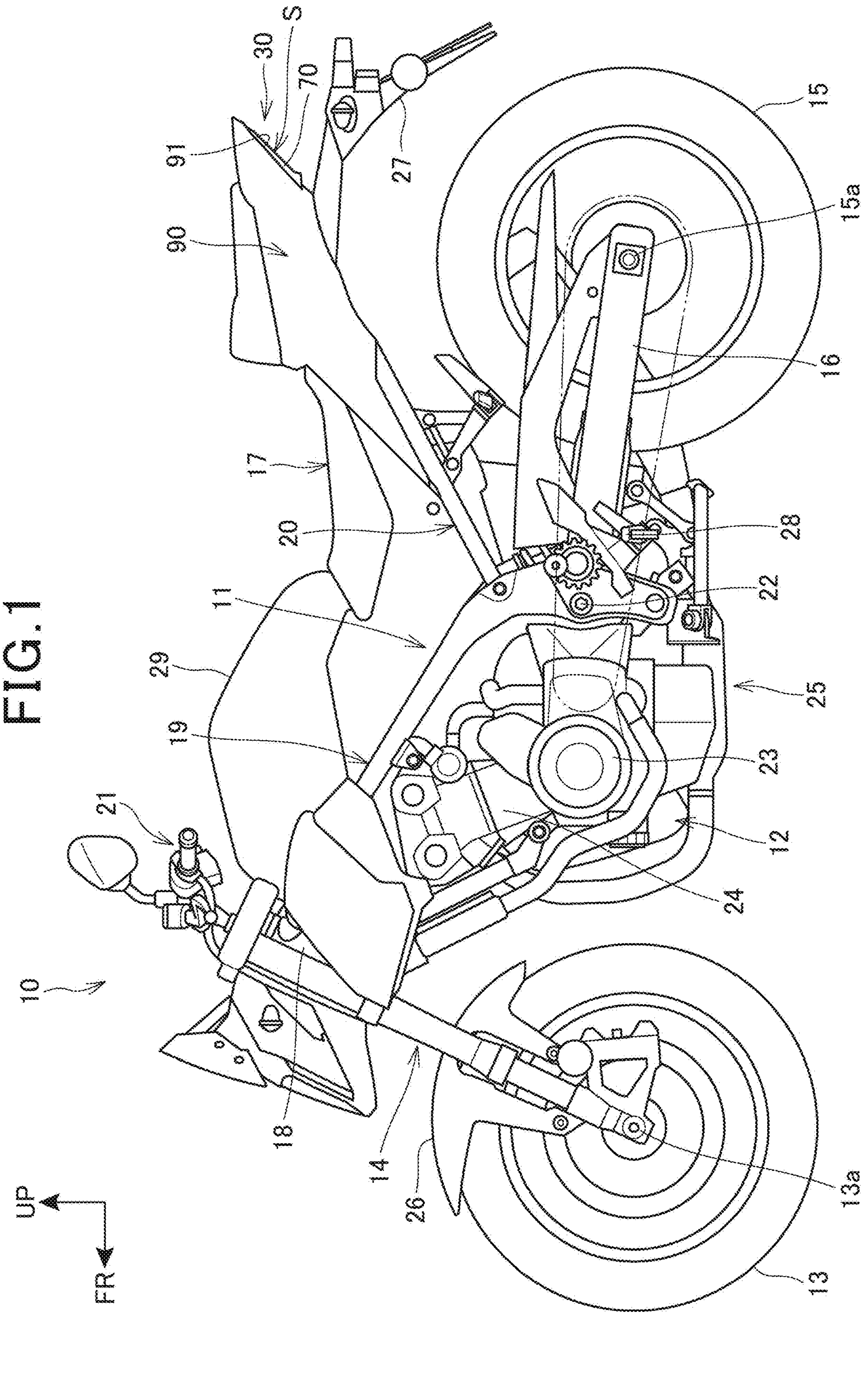
FIG. 1 is a side view of a saddle-ride vehicle according to an embodiment of the present invention.

An embodiment of the present invention will be described below with reference to the drawings. Unless otherwise mentioned, directions including front-rear, left-right, and up-down mentioned in the description are the same as those directions relative to a vehicle body. Reference signs FR, UP, and LH shown in the drawings indicate a vehicle body front side, a vehicle body upper side, and a vehicle body left side, respectively.

Embodiment

FIG. 1 is a side view of a saddle-ride vehicle 10 according to an embodiment of the present invention.

The saddle-ride vehicle 10 is a vehicle including a vehicle body frame 11, a power unit 12 supported on the vehicle body frame 11, a front fork 14 that supports a front wheel 13 in a steerable manner, a swing arm 16 that supports a rear wheel 15, and a seat 17 for a rider.

The saddle-ride vehicle 10 is a vehicle on which the rider sits astride the seat 17. The seat 17 is provided above a rear part of the vehicle body frame 11.

The vehicle body frame 11 includes a head pipe 18 provided at a front end portion of the vehicle body frame 11, a front frame 19 located on a rear side of the head pipe 18, and a rear frame 20 located on a rear side of the front frame 19. A front end portion of the front frame 19 is connected to the head pipe 18.

The seat 17 is supported on the rear frame 20.

The front fork 14 is supported on the head pipe 18 in such a manner that it can be steered left and right. The front wheel 13 is supported on an axle 13*a* provided at a lower end portion of the front fork 14. A handle 21 for steering that the rider grasps is mounted at an upper end portion of the front fork 14.

The swing arm 16 is supported on a pivot shaft 22 that is supported on the vehicle body frame 11. The pivot shaft 22 is a shaft extending horizontally in a vehicle width direction.

The pivot shaft 22 is passed through a front end portion of the swing arm 16. The swing arm 16 swings up and down around the pivot shaft 22.

The rear wheel 15 is supported on an axle 15*a* provided at a rear end portion of the swing arm 16.

The power unit 12 is disposed between the front wheel 13 and the rear wheel 15 and supported on the vehicle body frame 11.

The power unit 12 is an internal combustion engine. The power unit 12 includes a crankcase 23 and a cylinder 24 that houses a reciprocating piston. An exhaust device 25 is connected to an exhaust port of the cylinder 24.

An output of the power unit 12 is transmitted to the rear wheel 15 through a drive power transmission member that connects the power unit 12 and the rear wheel 15 to each other.

The saddle-ride vehicle 10 further includes a front fender 26 that covers the front wheel 13 from above, a rear fender 27 that covers the rear wheel 15 from above, footrests 28 on which the rider places his or her feet, and a fuel tank 29 that stores fuel to be used by the power unit 12.

The front fender 26 is mounted on the front fork 14. The rear fender 27 and the footrests 28 are provided on a lower side relative to the seat 17. The fuel tank 29 is supported on the vehicle body frame 11.

Figure 2:
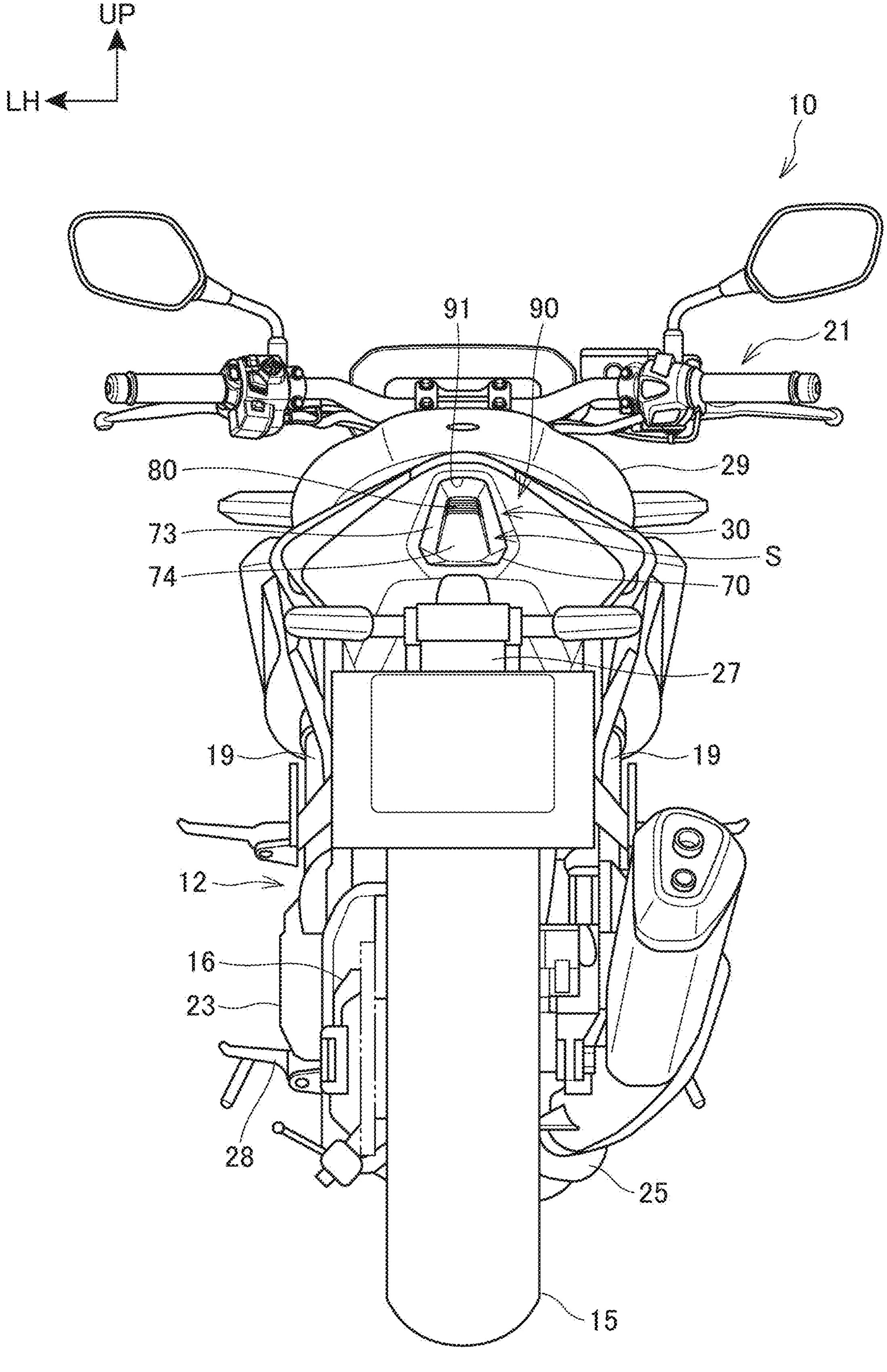
FIG. 2 is a rear view of the saddle-ride vehicle.

FIG. 2 is a rear view of the saddle-ride vehicle 10.

As shown in FIG. 2, a tail light unit 30 is provided at a rear end portion of the saddle-ride vehicle 10. The tail light unit 30 is a rear lamp of the saddle-ride vehicle 10 that indicates a position and a stopped state of the saddle-ride vehicle 10 by emitting light from a light-emitting surface S.

The saddle-ride vehicle 10 of the present embodiment includes a rear cover 90 that covers a rear part of the vehicle body. The rear cover 90 is provided with an opening 91 that opens rearward of the vehicle body. The tail light unit 30 is covered by the rear cover 90, and a portion thereof is exposed rearward (outside) through the opening 91. The exposed portion of the tail light unit 30 functions as the light-emitting surface S.

In the present embodiment, the opening 91 is formed substantially in a trapezoidal shape when viewed from the rear of the vehicle body. For this reason, the light-emitting surface S is similarly formed substantially in a trapezoidal shape when viewed from the rear of the vehicle body. The tail light unit 30 is disposed above the rear fender 27.

The tail light unit 30 is an example of a "vehicular lamp".

Figure 3:
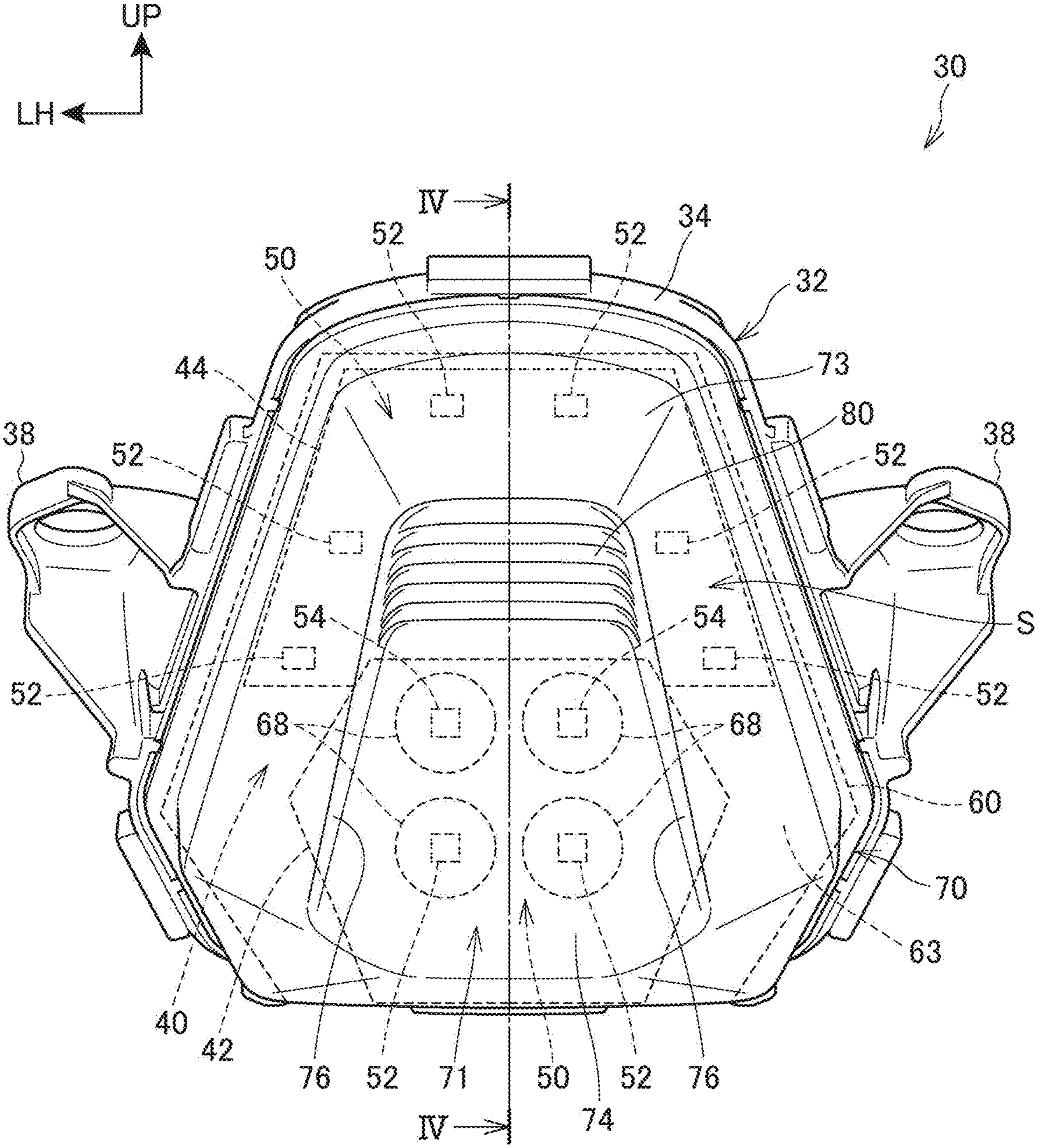
FIG. 3 is a rear view of a tail light unit.

FIG. 3 is a rear view of the tail light unit 30. FIG. 3 is a view of the tail light unit 30 when viewed from the rear of the vehicle body.

As shown in FIG. 3, the tail light unit 30 includes a unit body 32. The unit body 32 has a housing structure that houses a light source, optical members, and the like therein.

The unit body 32 includes a housing 34. The housing 34 is a housing that houses a light source, optical members, and the like therein. The housing 34 is recessed upward and forward and is open downward and rearward. The housing 34 includes an opening 35 that opens downward and rearward.

Fixing portions 38 are provided on both left and right ends of the housing 34. The fixing portions 38 are disposed on the left and right sides with the opening 35 interposed therebetween. Each of the fixing portions 38 protrudes outward in the vehicle width direction of the opening 35, and has a shape that allows a fastening member such as a screw member to be fastened thereto.

Figure 4:
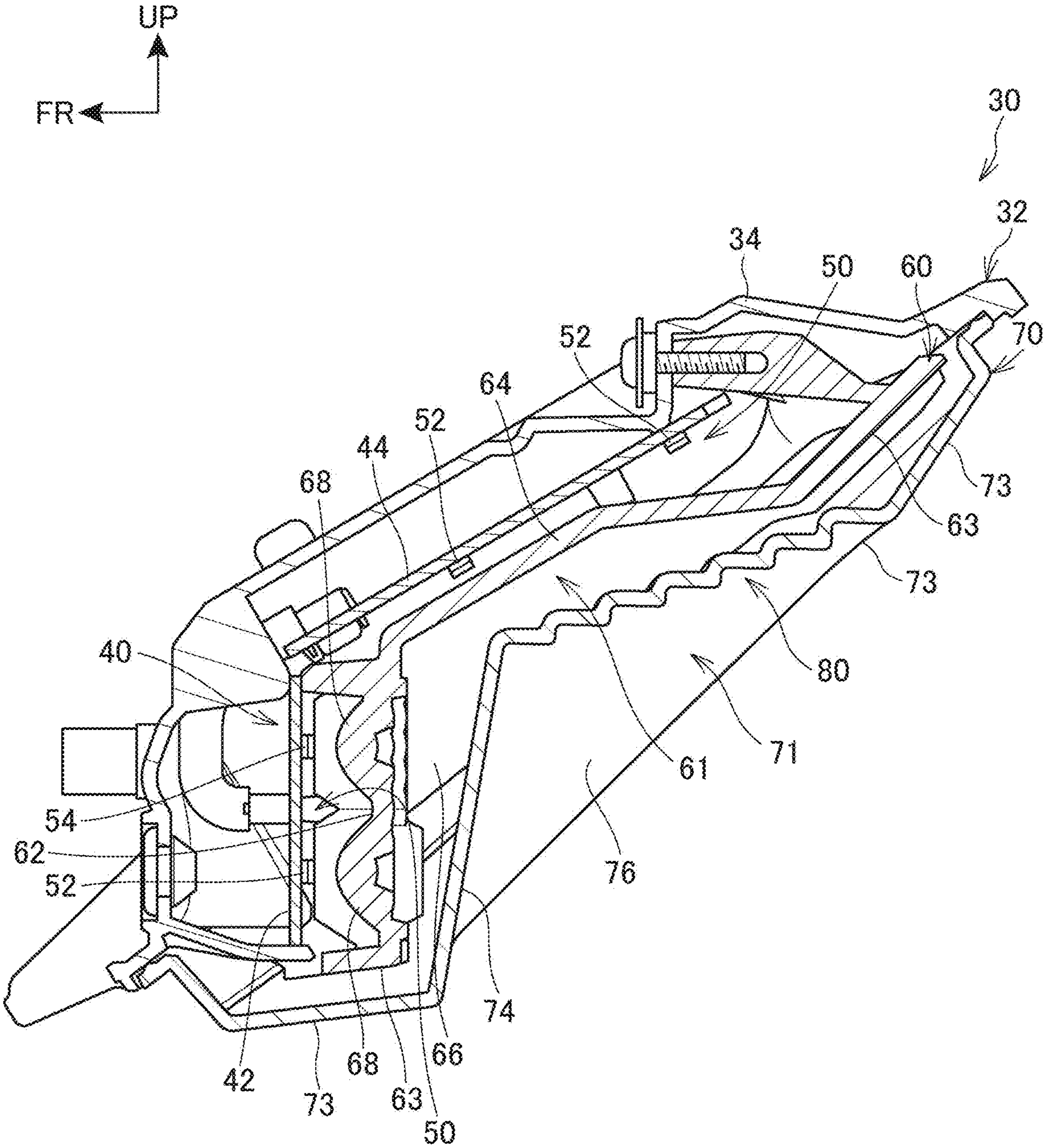
FIG. 4 is a cross-sectional view taken along line IV-IV in FIG. 3.

FIG. 4 is a cross-sectional view taken along line IV-IV in FIG. 3.

The housing 34 is mounted on the rear end portion of the vehicle body frame 11 through these fixing portions 38. As shown in FIG. 4, the housing 34 mounted on the vehicle body frame 11 such that a longitudinal direction thereof extends in the front-rear direction and is inclined so as to extend upward as going rearward.

In the housing 34 fixed to the vehicle body, the housing 34 forms a portion located on the front side, and also forms an upper part of the housing 34. The housing 34 is mounted on the vehicle body frame 11 so as to be recessed upward. In the housing 34, the opening 35 is located in a slantly inclined state so as to face the rear side and downwards of vehicle.

As shown in FIGS. 3 and 4, a light-emitting diode (LED) unit 40 is housed inside the housing 34. The LED unit 40 is a light-emitting element unit including an LED 50 such as a COB (Chips on Board) LED or an SMD (Surface Mount Device) LED and a drive circuit for driving the LED 50.

Power is fed to the LED unit 40 by, for example, a battery included in the saddle-ride vehicle 10.

The LED 50 corresponds to a "light source".

The LED unit 40 includes a first LED board 42 and a second LED board 44.

Both of the first LED board 42 and the second LED board 44 are plate-shaped printed wiring board on which a plurality of LEDs 50 are mounted.

The first LED board 42 is disposed so as to extend in the up-down direction. The first LED board 42 is supported on the housing 34 in a state where a mounting surface 43, on which the LED 50 is mounted, faces rearward.

In the present embodiment, the first LED board 42 is mounted with a first LED 52 and a second LED 54. A plurality of first LEDs 52 and a plurality of second LEDS 54 are provided, respectively (see FIG. 3).

The first LED 52 has an output capable of emitting as much light amount as that can function as a so-called tail lamp.

The second LED 54 has an output capable of emitting as much light amount as that can function as a so-called stop lamp. The second LED 54 has an output capable of emitting an emission light amount greater than that of the first LED 52, that is, capable of emitting more light than the first LED 52.

On the mounting surface 43, all of the first LEDs 52 are disposed on a lower end side of the first LED board 42. On the mounting surface 43, all of the second LEDs 54 are disposed on the upper side relative to the first LEDs 52, respectively.

An optical axis of each of the first LEDs 52 and an optical axis of each of the second LEDs 54 are directed rearward of the vehicle body.

The first LED 52 is an example of a "first light source". The second LED 54 is an example of a "second light source".

Similarly to the housing 34, the second LED board 44 is disposed so as to extend upward as going rearward. The second LED board 44 is supported on the housing 34 in a state where a mounting surface 45, on which the LED 50 is mounted, faces rearward and downward.

As shown in FIGS. 3 and 4, the second LED board 44 is disposed above the first LED board 42. The second LED board 44 is located on the rear side relative to at least a part of the first LED board 42.

In the present embodiment, the plurality of first LEDs 52 are mounted on the second LED board 44. As shown in FIG. 3, all of the first LEDs 52 are disposed side by side on the mounting surface 45 along an edge of the opening 35. When viewed from the rear of the tail light unit 30, each of the first LEDs 52 mounted on the second LED board 44 is disposed on the upper side relative to each of the first LEDs 52 and each of the second LEDs 54 mounted on the first LED boards 42.

Since the second LED board 44 is disposed so as to extend upward as going rearward, all of the optical axes of the first LEDs 52 are directed rearward and downward.

The housing 34 is provided with an inner lens 60. The inner lens 60 is a light guide member that guides the incident light in a predetermined direction by transmitting at least some of the incident light and reflecting at least some of the incident light inside. The inner lens 60 is formed in such a manner that a plate-like member formed of transparent resin or the like is molded to have a predetermined shape by plastic working or injection molding, for example. The inner lens 60 is colored to a predetermined color.

As shown in FIG. 3, the inner lens 60 is formed to cover approximately the entire opening 35. The inner lens 60 is supported on the housing 34. As shown in FIG. 4, the inner lens 60 includes, when viewed in an orthogonal direction of the opening 35, an inner recess 61 located approximately in a center and an inner peripheral edge portion 63 located around the inner recess 61.

An approximate center of the inner lens 60 is recessed toward the housing 34, whereby the inner recess 61 is formed.

The inner recess 61 is provided, and thus a first facing surface portion 62, a second facing surface portion 64, and a pair of inner side surface portions 66 are formed on the inner lens 60. In other words, the inner recess 61 is surrounded by the first facing surface portion 62, the second facing surface portion 64, and the pair of inner side surface portions 66.

The first facing surface portion 62 has a surface shape in which at least a part of the surface faces the first LED board 42. That is, the first facing surface portion 62 is formed so as to extend in the up-down direction.

The first facing surface portion 62 is an example of a "first inner lens surface".

As shown in FIG. 3, a plurality of diffusion lens portions 68 are provided on the first facing surface portion 62. Each of the diffusion lens portions 68 is disposed so as to overlap with one of the first LEDs 52 and one of the second LEDs 54 when viewed from the rear of the vehicle body. In other words, each of the diffusion lens portions 68 is provided so as to cover one of the first LEDs 52 and one of the second LEDs 54.

The diffusion lens portions 68 scatter the light emitted from the overlapped first LEDs 52 or second LEDS 54 toward the rear side. In other words, the diffusion lens portions 68 function as light diffusion lenses that diffuse the light emitted from the first LED 52 and the second LED 54.

The second facing surface portion 64 has a surface shape that faces the second LED board 44, and at least a part of the surface has a flat surface that faces the second LED board 44 in parallel. The second facing surface portion 64 is formed slantly so as to extend upward as going rearward. The second facing surface portion 64 includes a front end that is continuous with an upper end of the first facing surface portion 62. The second facing surface portion 64 includes an upper end that is continuous with a front end of the first facing surface portion 62.

The second facing surface portion 64 is an example of a "second inner lens surface".

All of the pair of inner side surface portions 66 have a surface shape that faces in the vehicle width direction. Each of the inner side surface portions 66 surrounds, from the left and right in the vehicle width direction, the first facing surface portion 62, the second facing surface portion 64, and the inner recess 61. The first facing surface portion 62, the second facing surface portion 64, and the pair of inner side surface portions 66 are continuous with each other at adjacent locations.

The inner peripheral edge portion 63 covers the opening 35, and has a surface shape that is continuous with the first facing surface portion 62, the second facing surface portion 64, and the pair of inner side surface portions 66 at adjacent locations. The inner peripheral edge portion 63 covers the first LED 52 mounted on the first LED board 42.

As shown in FIGS. 3 and 4, the unit body 32 includes an outer lens 70. Similarly to the inner lens 60, the outer lens 70 is a light guide member that guides the incident light by transmitting at least some of the incident light and reflecting the incident light inside. The outer lens 70 is formed in such a manner that a plate-like member formed of transparent resin or the like is molded to have a predetermined shape by plastic working or injection molding, for example. The outer lens 70 is colored to a predetermined color.

The outer lens 70 is mounted on the housing 34 so as to cover the opening 35 from the outside of the inner lens 60. In other words, the outer lens 70 is mounted on the housing 34, thereby covering the inner lens 60 and closing the opening 35. In the tail light unit 30, the outer lens 70 is mounted on the housing 34 to form the housing structure of the unit body 32. In the unit body 32, the housing 34 forms a front part and an upper part of the unit body 32, and the outer lens 70 forms a rear part and a lower part of the unit body 32.

The outer lens 70 functions as the light-emitting surface S of the tail light unit 30, as a whole.

As shown in FIG. 4, the outer lens 70 is formed such that at least a portion expands rearward and downward relative to the opening 35. Therefore, the entire outer lens 70 is disposed apart from the inner lens 60.

The outer lens 70 includes, when viewed in an orthogonal direction of the opening 35, an outer recess 71 located approximately in a center and an outer peripheral edge portion 73 located around the outer recess 71.

The approximate center of the outer lens 70 is recessed toward the housing 34, whereby the outer recess 71 is formed.

The outer recess 71 is provided, and thus the outer lens 70 is formed with a step-shaped portion 80, an outer facing surface portion 74, and a pair of outer side surface portions 76. In other words, the outer recess 71 is surrounded by the outer facing surface portion 74, the step-shaped portion 80, and the pair of outer side surface portions 76.

The outer facing surface portion 74 has a planar shape in which at least a part of the surface faces the first LED board 42 and the first facing surface portion 62. In the present embodiment, the outer facing surface portion 74 is formed to be a flat surface as a whole.

The outer facing surface portion 74 is formed so as to extend in the up-down direction and extend rearward as going upward. In the present embodiment, the outer facing surface portion 74 is formed so as to be inclined rearward relative to the first LED board 42 and the first facing surface portion 62, and is formed so as to be erected at a larger angle than the housing 34 and the second LED board 44.

The outer facing surface portion 74 may be erected to extend in the up-down direction.

The outer facing surface portion 74 is an example of a "first outer lens surface".

As shown in FIGS. 3 and 4, the outer facing surface portion 74 covers all of the first LED board 42 and the first facing surface portion 62 from the rear side. The outer facing surface portion 74 is disposed apart from the first facing surface portion 62.

As shown in FIG. 4, the step-shaped portion 80 is formed in a staircase shape when viewed in a vertical cross-section along a plane in the front-rear direction.

The step-shaped portion 80 is formed as a whole so as to be directed upward as going rearward. The step-shaped portion 80 includes a front end that is continuous with the upper end of the outer facing surface portion 74. As shown in FIG. 3, when viewed from the rear of the tail light unit 30, the step-shaped portion 80 is located above the outer facing surface portion 74. The step-shaped portion 80 is disposed apart from the second facing surface portion 64, and is provided to face the second facing surface portion 64.

The step-shaped portion 80 is an example of a "second outer lens surface".

Figure 5:
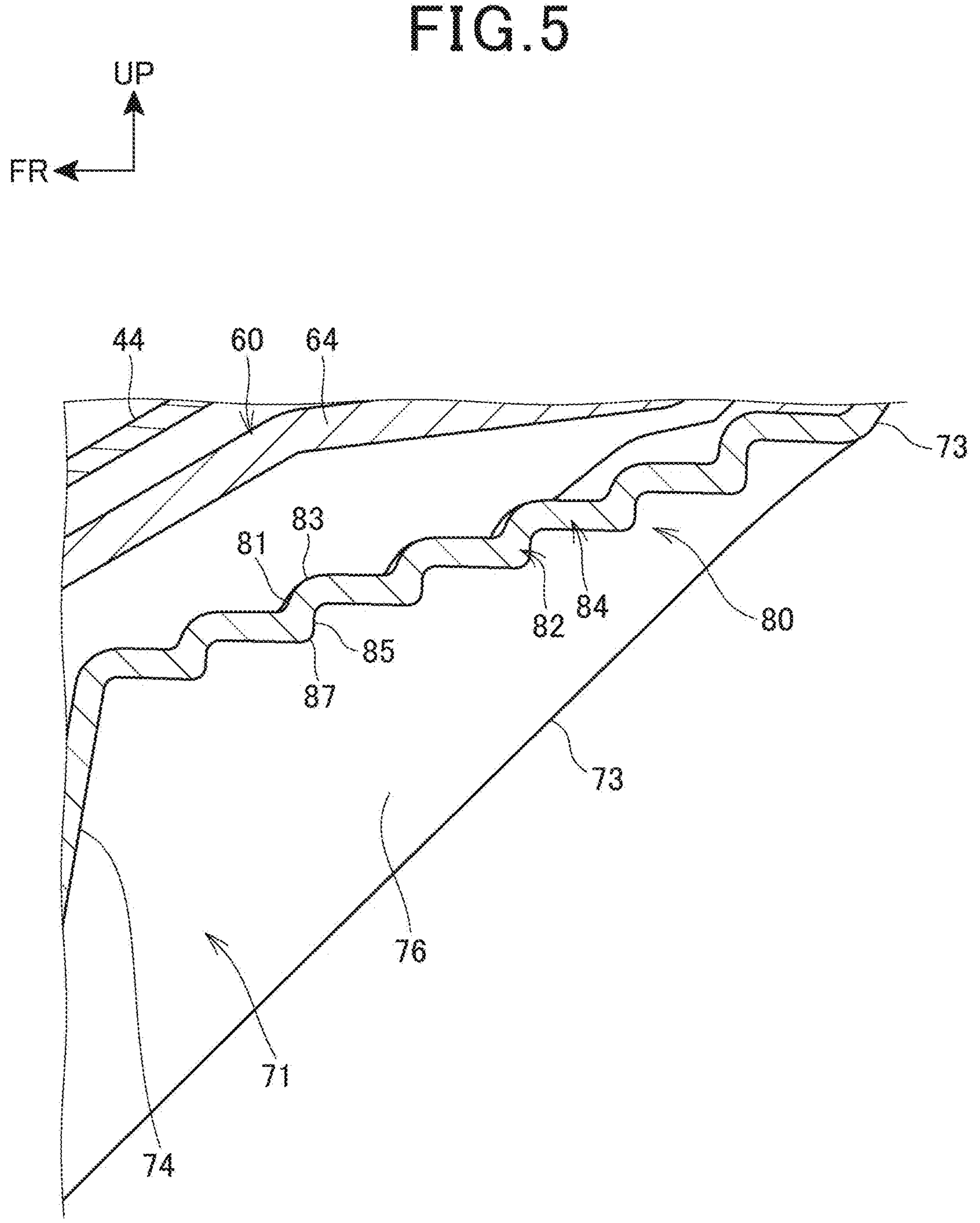
FIG. 5 is an enlarged view of a step-shaped portion shown in FIG. 4.

FIG. 5 is an enlarged view of the step-shaped portion 80 shown in FIG. 4.

As shown in FIG. 5, the step-shaped portion 80 includes step portions 82 having a planar shape extending in the up-down direction and extension portions 84 having a planar shape extending in the front-rear direction, the step portions 82 and the extension portions 84 being alternately formed from the front end to the rear end.

The extension portions 84 are formed to be inclined downward as going rearward. For this reason, planes of the extension portions 84 are formed to be directed downward and forward.

A length in the up-down direction of the step portion 82 is formed to be shorter than a length in the front-rear direction of the extension portion 84. In the present embodiment, the length in the up-down direction of the step portion 82 is formed to be approximately the same as a thickness of the outer lens 70 or to be slightly longer than the thickness.

The step-shaped portion 80 is provided with a number of step shapes in which the length in the up-down direction of the step portion 82 is shorter than the length in the front-rear direction of the extension portion 84.

A lower end of each of the step portions 82 is connected to a rear end of each of the extension portions 84. As described above, the outer lens 70 is formed by molding of the plate-like member, and thus connection locations between the step portions 82 and the extension portion 84 have a bent shape such that the plate-like member protrudes upward.

The outer lens 70 includes a lens inner surface 75 that faces the second facing surface portion 64 and faces the inside of the unit body 32, and a lens outer surface 77 that faces the outside of the unit body 32.

In the lens inner surface 75, the step-shaped portion 80 is provided with an inner surface up-down-direction stretching portion 81 located at the step portion 82, and an inner surface bent portion 83 located at the connection location between the step portion 82 and the extension portion 84.

The lens inner surface 75 is an example of an "inner surface". The lens outer surface 77 is an example of an "outer surface".

In the present embodiment as described above, the length in the up-down direction of the step portion 82 is formed to be short. Therefore, when viewed in a vertical cross-section along a plane in the front-rear direction, the inner surface up-down-direction stretching portion 81 is formed in an inclined surface shape that extends upward as going rearward.

The inner surface bent portion 83 is formed in a curved shape that protrudes upward.

In the lens outer surface 77, the step-shaped portion 80 is provided with an outer surface up-down-direction stretching portion 85 located at the step portion 82, and an outer surface bent portion 87 located at the connection location between the step portion 82 and the extension portion 84.

The outer surface up-down-direction stretching portion 85 is formed in a planar shape extending in the up-down direction.

The outer surface bent portion 87 is formed in a curved shape that protrudes upward.

In the step-shaped portion 80, the inner surface up-down-direction stretching portion 81 and the outer surface bent portion 87 overlap each other in the front-rear direction view. Similarly, in the step-shaped portion 80, the outer surface up-down-direction stretching portion 85 and the inner surface bent portion 83 overlap each other in the front-rear direction view.

Here, the front-rear direction view refers to a view in the front-rear direction of the vehicle body. In the present embodiment, this refers to when viewed from the rear side of the vehicle body, that is, a rear view.

Thus, when the light emitted from the first LED 52 or the second LED 54 transmits through the step-shaped portion 80, the light passes through either of the inner surface bent portion 83 or the outer surface bent portion 87. Therefore, the light emitted from the first LED 52 or the second LED 54 is more likely to be refracted downward when transmitting through the step-shaped portion 80. For this reason, the step-shaped portion 80 can guide the transmitted light downward, and reduce the amount of light emitted rearward.

As shown in FIGS. 3 and 4, all of the pair of outer side surface portions 76 have a surface shape that faces in the vehicle width direction. Each of the outer side surface portions 76 surrounds, from the left and right in the vehicle width direction, the step-shaped portion 80 and the outer facing surface portion 74. The step-shaped portion 80, the outer facing surface portion 74, and the pair of outer side surface portions 76 are continuous with each other at adjacent locations.

The outer peripheral edge portion 73 covers the opening 35, and has a surface shape that is continuous with the step-shaped portion 80, the outer facing surface portion 74, and the pair of outer side surface portions 76 at adjacent locations. The outer peripheral edge portion 73 includes a peripheral edge connected to the peripheral edge of the opening 35.

Next, an operation of the tail light unit 30 will be described.

When the saddle-ride vehicle 10 is being driven, each of the first LEDs 52 in the tail light unit 30 is constantly turned on as a tail lamp. On the contrast, none of the second LEDs 54 are turned on.

Figure 6:
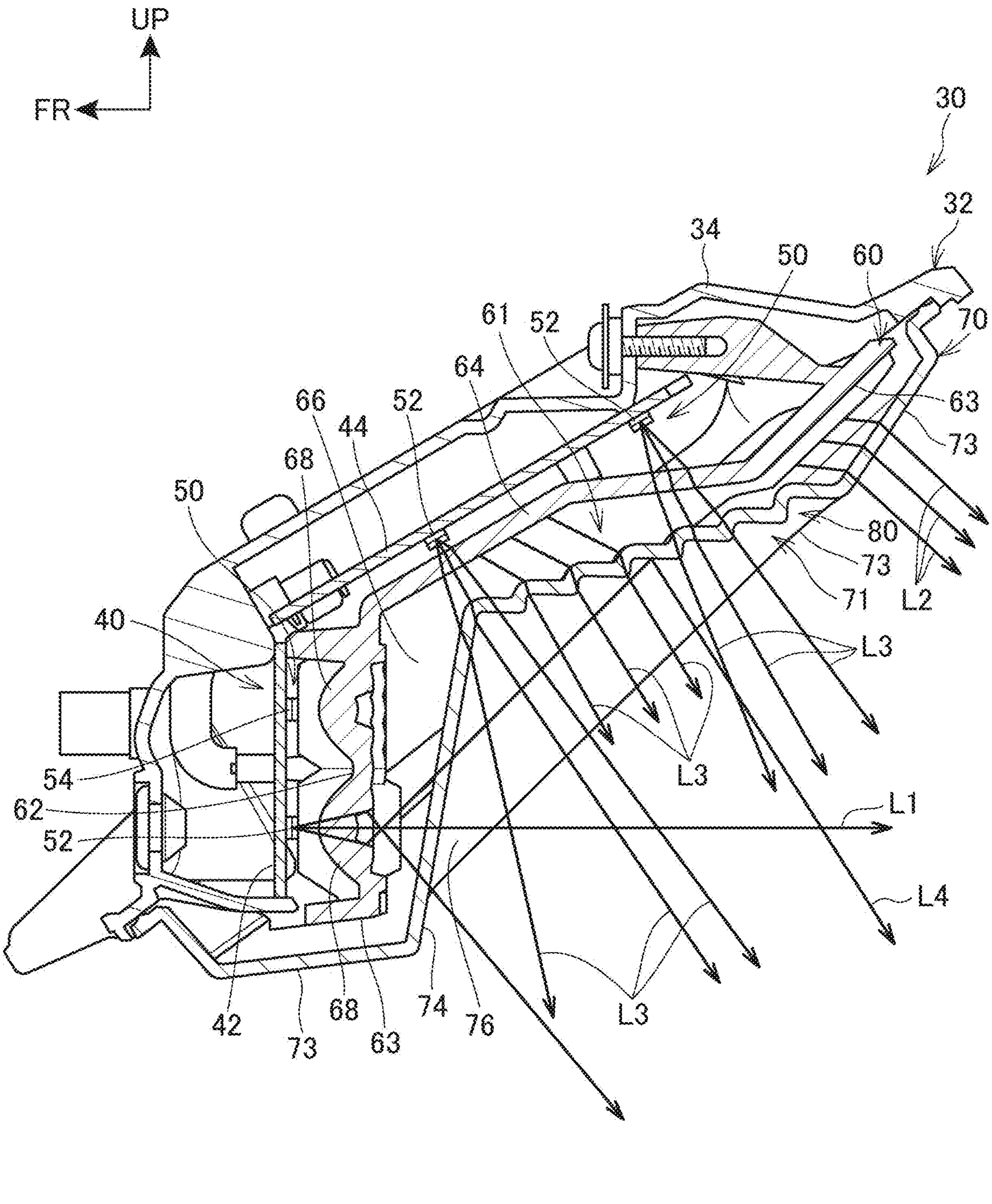
FIG. 6 is a view illustrating a traveling direction of light from a first LED in FIG. 4.

FIG. 6 is a view illustrating a traveling direction of the light from the first LED 52 in FIG. 4. In FIG. 6, the light from the first LED 52 is indicated by arrows.

As shown in FIG. 6, some of the light emitted from the first LED 52 mounted on the first LED board 42 is diffused by the diffusion lens portion 68. Some of the light emitted from the diffusion lens portion 68 is emitted from the outer lens 70 as light L1 that transmits through the outer facing surface portion 74 and is directed rearward.

The inner lens 60 guides some of the light emitted from the first LED 52 to the second facing surface portion 64 and the inner peripheral edge portion 63, and then emits the light from the second facing surface portion 64 and the inner peripheral edge portion 63.

Out of the light emitted from the second facing surface portion 64 and the inner peripheral edge portion 63, the light incident on the outer peripheral edge portion 73 is refracted to be emitted from the outer lens 70 as light L2 directed downward and rearward.

In contrast, out of the light emitted from the second facing surface portion 64 and the inner peripheral edge portion 63, the light incident on the step-shaped portion 80 is refracted and transmitted through the inner surface bent portion 83, the outer surface bent portion 87, or the extension portion 84, and thus is emitted from the outer lens 70 as light L3 directed downward relative to the light incident on the outer peripheral edge portion 73.

In the first LED 52 mounted on the first LED board 42, some of the light emitted from the diffusion lens portion 68 transmits through the outer facing surface portion 74, and then is directed to the step-shaped portion 80. The light directed to the step-shaped portion 80 is reflected by the extension portion 84 and becomes light L4 directed downward.

In this way, the light L3 and L4 emitted or reflected from the step-shaped portion 80 are directed downward relative to the light L1 and L2 emitted from the outer peripheral edge portion 73 and the outer facing surface portion 74.

Figure 7:
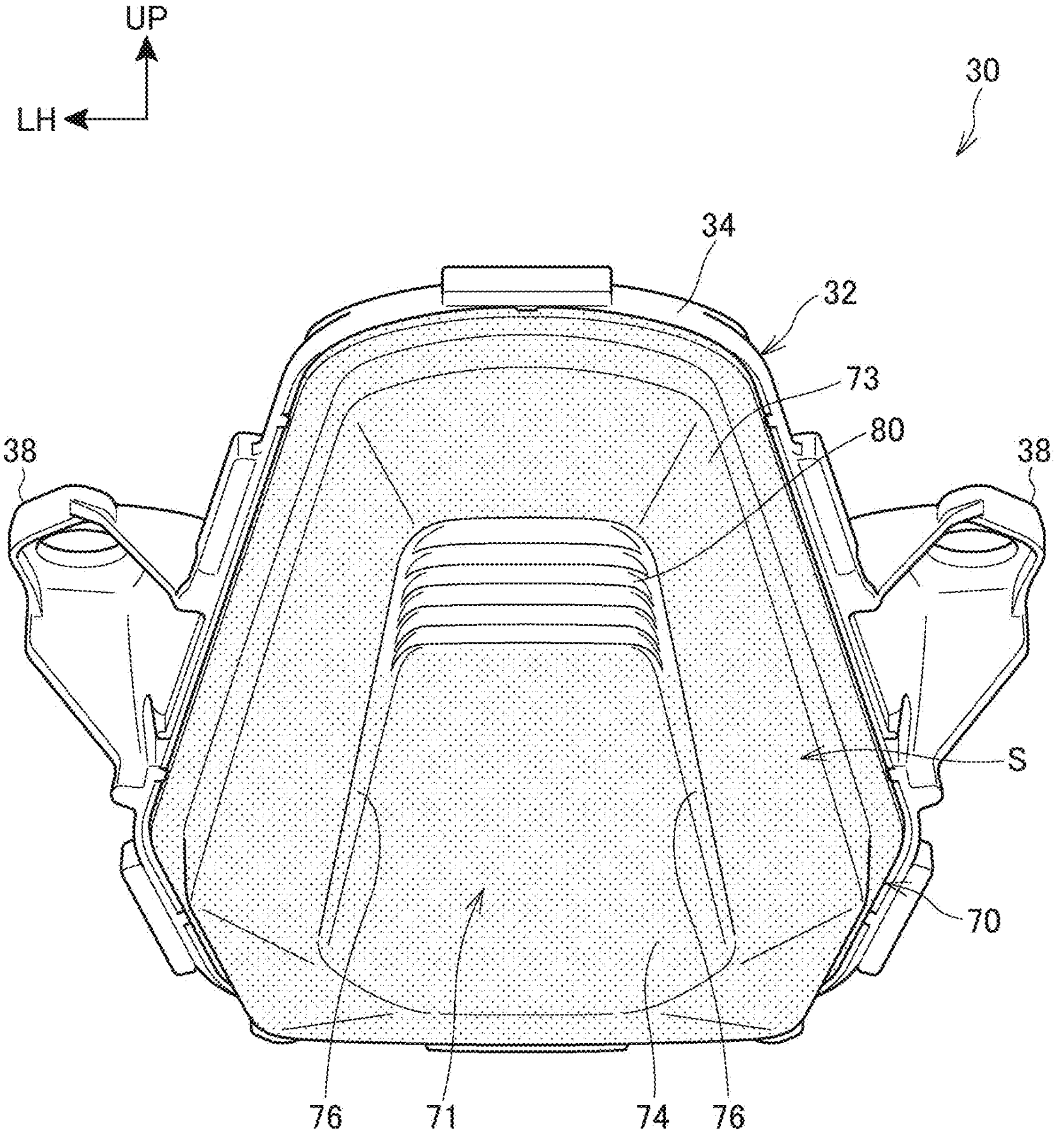

FIG. 7 is a rear view of the tail light unit 30 in which the first LED 52 is being turned on. For the convenience of description, the light-emitting surface S is indicated by dots in FIG. 7.

When the tail light unit 30 is viewed from the rear side in a state where only the first LED 52 in the tail light unit 30 is turned on, the step-shaped portion 80 has a lower brightness of a predetermined value or less relative to the outer peripheral edge portion 73 and the outer facing surface portion 74.

For this reason, as shown in FIG. 7, when the tail light unit 30 is viewed from the rear side in a state where only the first LED 52 in the tail light unit 30 is turned on, the step-shaped portion 80 appears to emit less light than other portions of the outer lens 70.

In this way, the step-shaped portion 80 is provided in the tail light unit 30, and thus it is possible to form a portion that appears not to emit light, without using, for example, paint with light-blocking properties. In the tail light unit 30, therefore, it is possible to prevent an increase in materials such as paint involved in the manufacturing, and to prevent an increase in the number of processes including a process of applying paint during the manufacturing, thereby reducing costs involved in the manufacturing.

For example, when the brake unit is actuated in the state where the saddle-ride vehicle 10 is being driven, the second LED 54 in the tail light unit 30 is turned on in addition to the first LED 52. Thus, the tail light unit 30 is turned on as a stop lamp.

Figure 8:
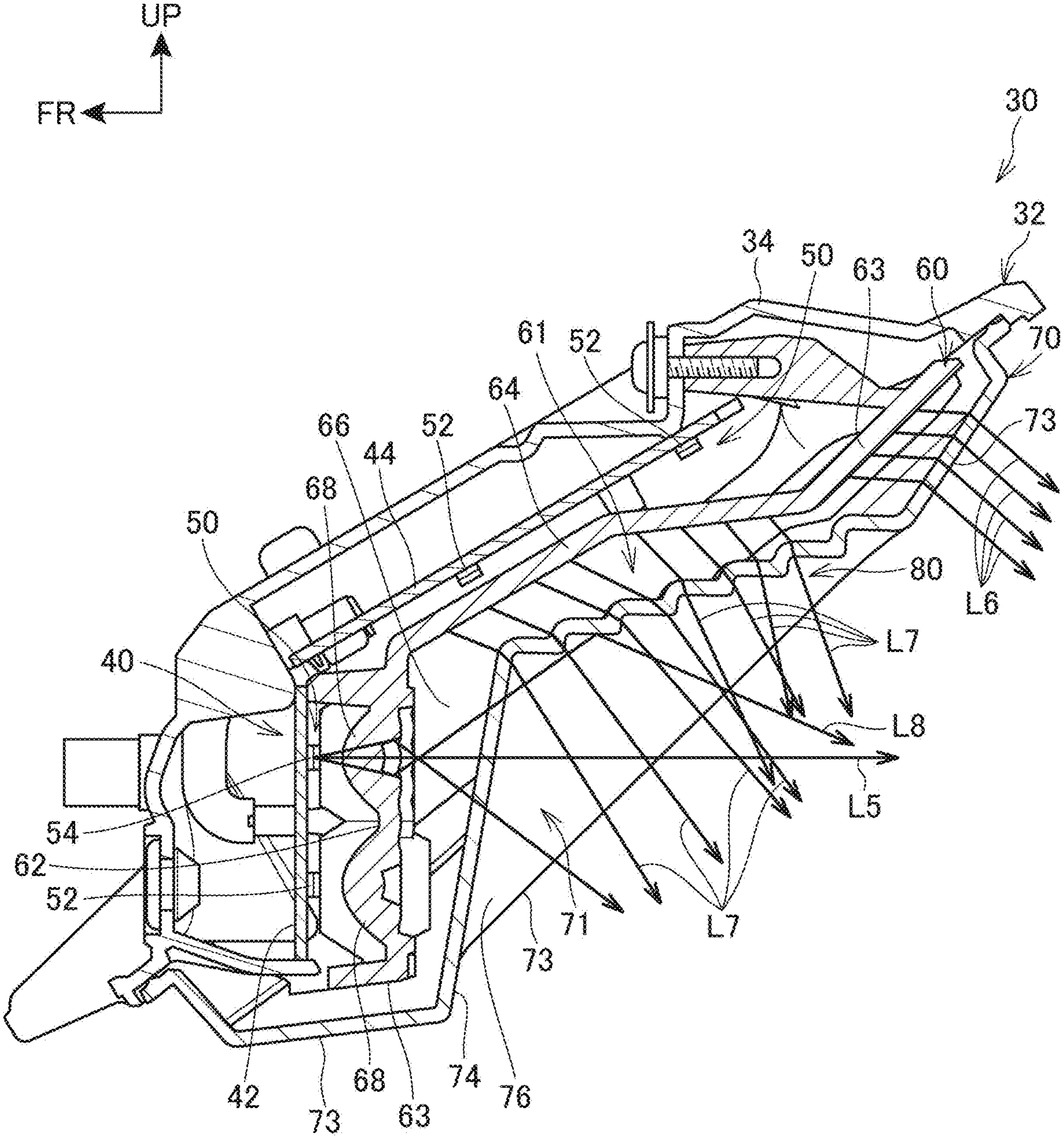
FIG. 8 is a view illustrating a traveling direction of light from a second LED in FIG. 4.

FIG. 8 is a view illustrating a traveling direction of the light from the second LED 54 in FIG. 4. In FIG. 8, the light from the second LED 54 is indicated by arrows.

As shown in FIG. 8, some of the light emitted from the second LED 54 is diffused by the diffusion lens portion 68. Some of the light emitted from the diffusion lens portion 68 is emitted from the outer lens 70 as light L5 that transmits through the outer facing surface portion 74 and is directed rearward.

The inner lens 60 guides some of the light emitted from the second LED 54 to the second facing surface portion 64 and the inner peripheral edge portion 63, and then emits the light from the second facing surface portion 64 and the inner peripheral edge portion 63.

Out of the light emitted from the second facing surface portion 64 and the inner peripheral edge portion 63, the light incident on the outer peripheral edge portion 73 is refracted to be emitted from the outer lens 70 as light L6 directed downward and rearward.

Out of the light emitted from the second facing surface portion 64 and the inner peripheral edge portion 63, the light incident on the step-shaped portion 80 transmits through the inner surface bent portion 83, the outer surface bent portion 87, or the extension portion 84, and thus is emitted from the outer lens 70 as light L7 directed downward relative to the light incident on the outer peripheral edge portion 73.

In the second LED 54, some of the light emitted from the diffusion lens portion 68 transmits through the outer facing surface portion 74 and then is directed to the step-shaped portion 80.

The second LED 54 is disposed above the first LED 52 on the first LED board 42. In other words, the second LED 54 is disposed at a position closer to the step-shaped portion 80 in the up-down direction relative to the first LED 52.

Thus, the light emitted from the second LED 54 and directed to the step-shaped portion 80 is reflected by the extension portion 84 at a shallower angle than the light emitted from the first LED 52 and directed to the step-shaped portion 80, and becomes light L8 directed downward and rearward.

Therefore, the light L8 is directed rearward at a shallower angle than the light L3 and L4, for example.

The second LED 54 has an output capable of emitting a larger amount of light than the first LED 52.

In this way, when the tail light unit 30 is turned on as a stop lamp, the light L8 is directed rearward from the step-shaped portion 80 at a shallower angle than the light L3 and L4 and with a larger amount of light than the light L3 and L4.

Figure 9:
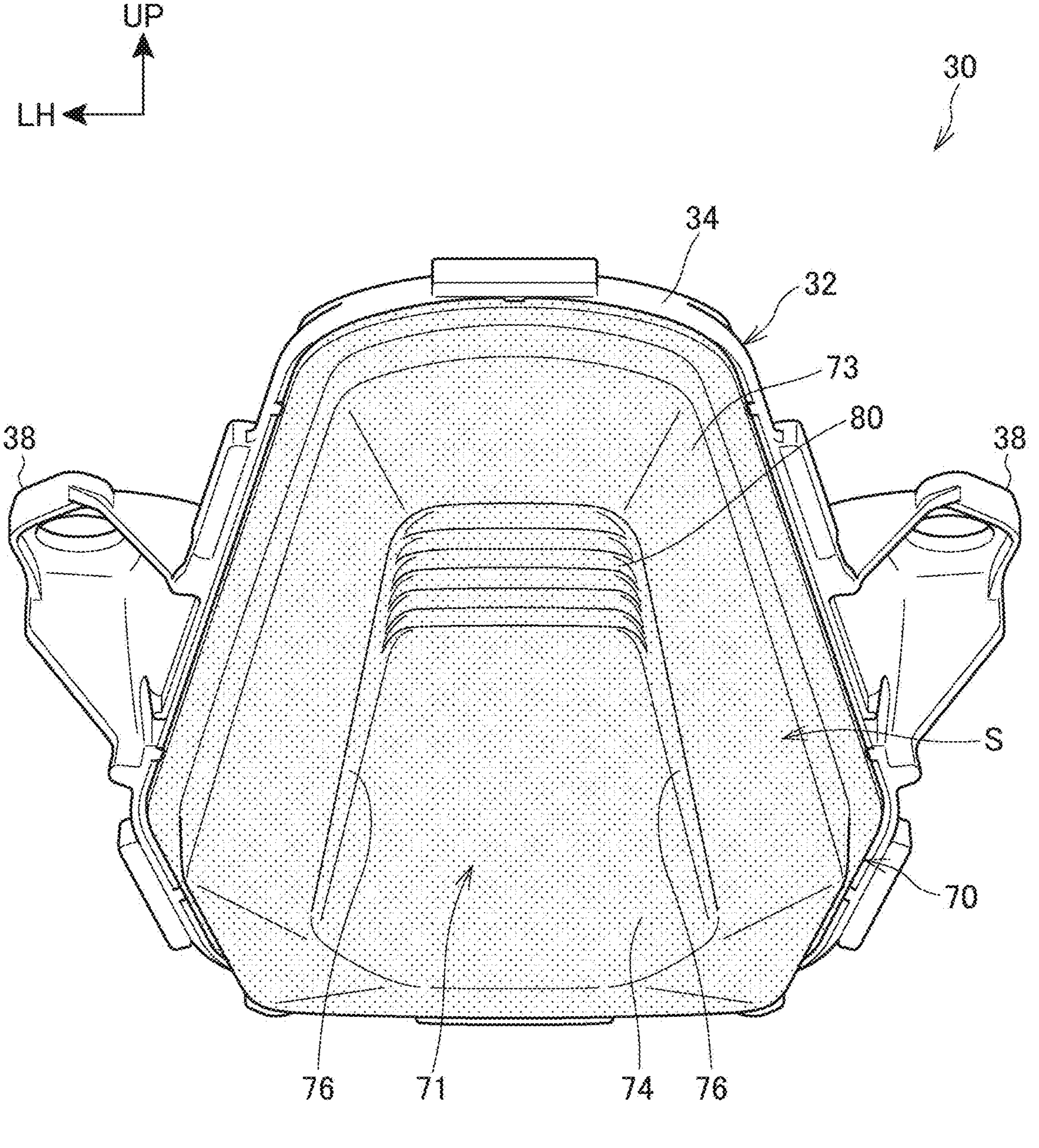

FIG. 9 is a rear view of the tail light unit 30 in which the second LED 54 is being turned on. For the convenience of description, the light-emitting surface S is indicated by dots in FIG. 9.

When the tail light unit 30 is viewed from the rear side in a state where the first LED 52 and the second LED 54 in the tail light unit 30 are turned on, the outer peripheral edge portion 73, the outer facing surface portion 74, and the step-shaped portion 80 emit light with brightness of a predetermined value or more.

For this reason, as shown in FIG. 9, when the tail light unit 30 is viewed from the rear side in a state where the first LED 52 and the second LED 54 in the tail light unit 30 are turned on, the entire outer lens 70 including the step-shaped portion 80 appears to emit light with brightness of a predetermined value or more.

In this way, the tail light unit 30 is provided with the step-shaped portion 80 and two LEDs 50 with different outputs and these LEDs 50 are disposed at predetermined positions, whereby it is possible to change the light-emitting surface S according to functions without using paint or the like. In the tail light unit 30, therefore, it is possible to reduce costs involved in the manufacturing, and to achieve a plurality of different light-emitting surfaces S at low costs. In other words, in the tail light unit 30, it is possible to improve design quality of the light-emitting surface S at low costs.

Other Embodiments

The above-described embodiment is merely an example of one aspect of the present invention, and can be arbitrarily modified and applied within a range not departing from the spirit of the present invention.

In the embodiment described above, the outer lens 70 is provided with the step-shaped portion 80. However, the present invention is not limited thereto, and the outer lens 70 may be provided with a flat-shaped portion or a curve-shaped portion instead of the step-shaped portion 80. Such a shape is formed so as to face the lower side of the vehicle body. Such a shape is formed such that at least some of the light collected from the first LED 52 is directed downward when being transmitted or reflected.

In the embodiment described above, the tail light unit 30 includes the LED 50 as a light source. However, the present invention is not limited thereto, and the tail light unit 30 may include another light-emitting element such as a semiconductor laser. Furthermore, the tail light unit 30 is not limited to the light-emitting element, and may include another light source such as a light source for a lamp, for example, a discharge lamp or a halogen lamp.

Although the structure of the tail light unit 30 has been described in the embodiment described above, the present invention is not limited thereto, and a so-called headlight unit, which is a headlight, may have a structure similar to the tail light unit 30.

Unless otherwise specified, the horizontal, vertical, and other directions and shapes in the above-described embodiment include a so-called equivalent range in which the same operational effect is achieved as those directions and shapes.

Configurations to be Supported by Above-Described Embodiment

The above-described embodiment supports Configurations below.

(Configuration 1) A vehicular lamp including: a light source; and an outer lens that transmits and reflects light emitted from the light source, in which: the outer lens includes a first outer lens surface that extends in an up-down direction of the vehicular lamp, and a second outer lens surface that extends in a front-rear direction of the vehicular lamp; the second outer lens surface is located on an upper side relative to the light source and the first outer lens surface, and is located either on a front side or a rear side relative to the light source and the first outer lens surface; and the second outer lens surface is provided in a step shape.

According to such a configuration, the second outer lens surface is formed in the step shape, and thus the light, which is reflected by the step shape of the second outer lens surface after passing through the first outer lens surface, out of the light emitted from the light source is reflected in the down direction of the lamp. Thus, according to the vehicular lamp, the shape of the outer lens makes it easier for the second outer lens surface to appear not to become bright when viewed in an emission-axis direction of the light source. Therefore, according to vehicular lamp, the light can be made hard to see by shining rearward without the need for an additional process of applying the light-blocking paint to the second outer lens surface, and both reduction in costs and a design freedom can be achieved.

(Configuration 2) In the vehicular lamp according to configuration 1, at least some of the light from the light source is reflected downward of the vehicular lamp at the second outer lens surface after passing through the first outer lens surface.

According to such a configuration, in the vehicular lamp, the shape of the outer lens makes it easier for the second outer lens surface to appear not to become bright when viewed in an emission-axis direction of the light source. Therefore, according to vehicular lamp, the light can be made hard to see by shining rearward without the need for an additional process of applying the light-blocking paint to the second outer lens surface, and both reduction in costs and a design freedom can be achieved.

(Configuration 3) In the vehicular lamp according to configuration 1 or 2, the vehicular lamp includes an inner lens through which the light from the light source passes, the inner lens includes a first inner lens surface that is located between the light source and the first outer lens surface in the front-rear direction of the vehicular lamp, and a second inner lens surface that is continuous with the first inner lens surface and is located on an upper side relative to the second outer lens surface, and at least the some of the light from the light source incident on the first inner lens surface is guided inside the inner lens to be emitted from the second inner lens surface, and is refracted at the second outer lens surface to be emitted.

According to such a configuration, the second outer lens surface has the step shape to refract the light which is emitted from the inner lens and reaches the second outer lens surface. Therefore, according to vehicular lamp, it is possible for the second outer lens surface to make appear not to become brighter, and both reduction in costs and a design freedom can be achieved.

(Configuration 4) In the vehicular lamp according to configuration 3, the second outer lens surface includes an inner surface that faces an inner side of the vehicular lamp, and an outer surface that faces an outer side of the vehicular lamp, the inner surface of the portion located in the step shape includes an inner surface up-down-direction stretching portion that extends in the up-down direction of the vehicular lamp, and an inner surface bent portion that extends in the front-rear direction of the vehicular lamp, the outer surface of the portion located in the step shape includes an outer surface up-down-direction stretching portion that extends in the up-down direction of the vehicular lamp, and an outer surface bent portion that extends in the front-rear direction of the vehicular lamp, and when viewed in the front-rear direction, the inner surface up-down-direction stretching portion and the outer surface bent portion overlap, and the outer surface up-down-direction stretching portion and the inner surface bent portion overlap.

According to such a configuration, in the vehicular lamp, the light passing through the second outer lens surface is more likely to pass through either the inner surface bent portion or the outer surface bent portion. Therefore, in the vehicular lamp, the light passing through the second outer lens surface can be guided downward, and is prevented from being emitted in the front-rear direction of the vehicle.

(Configuration 5) In the vehicular lamp according to configuration 1 or 2, the light source includes at least two light sources which are a first light source and a second light source, and the first light source is located above the second light source, and has an emission light amount greater than that of the second light source.

According to such a configuration, the light from the light source with a small emission light amount is reflected at a large angle by the second outer lens surface, and the light from the light source with a large emission light amount is reflected at a small angle by the second outer lens surface. Therefore, in the vehicular lamp, a visual field of the second outer lens surface can be changed depending on use purposes.

(Configuration 6) In the vehicular lamp according to any one of Configurations 1 to 5, the vehicular lamp is a rear lamp that is provided at a rear part of a vehicle.

According to such a configuration, it is possible to reduce costs while improving design quality of the rear lamp.

Reference Signs List

10 saddle-ride vehicle
30 tail light unit (vehicular lamp)
50 LED (light source)
52 first LED (first light source)
54 second LED (second light source)
60 inner lens
62 first facing surface portion (first inner lens surface)
64 second facing surface portion (second inner lens surface)
70 outer lens
74 outer facing surface portion (first outer lens surface)
75 lens inner surface (inner surface)
77 lens outer surface (outer surface)
80 step-shaped portion (second outer lens surface)
81 inner surface up-down-direction stretching portion
83 inner surface bent portion
85 outer surface up-down-direction stretching portion
87 outer surface bent portion
L1, L2, L3, L4, L5, L6, L7, L8 light
S light-emitting surface

The invention claimed is:

1. A vehicular lamp comprising:
a light source; and
an outer lens that transmits and reflects light emitted from the light source,
the vehicular lamp further comprising an inner lens that is covered by the outer lens and guides the light from the light source in a predetermined direction, wherein
the outer lens includes
a first outer lens surface that extends in an up-down direction of the vehicular lamp, and
a second outer lens surface that extends in a front-rear direction of the vehicular lamp,
the second outer lens surface is located on an upper side relative to the light source and the first outer lens surface, and is located on a rear side relative to the light source and the first outer lens surface,
the second outer lens surface is provided as a whole in a step shape in which step portions and extension portions are alternately formed so as to be directed upward as going rearward from a front end to a rear end, each of the step portions having a planar shape extending in the up-down direction, each of the extension portions-having a planar shape extending in the front-rear direction, and one end of the step shape is continuous with an upper end of the first outer lens surface, and
at least some of the light from the light source is reflected downward of the vehicular lamp at the extension portions after passing through the first outer lens surface.

2. The vehicular lamp according to claim 1, wherein
at least some of the light from the light source is diffused and guided by the inner lens so as to be directed to the extension portions, and is reflected downward of the vehicular lamp at the extension portions.

3. The vehicular lamp according to claim 1, wherein
the inner lens includes
a first inner lens surface that is located between the light source and the first outer lens surface in the front-rear direction of the vehicular lamp, and
a second inner lens surface that is continuous with the first inner lens surface and is located on an upper side relative to the second outer lens surface, and
at least some of the light from the light source incident on the first inner lens surface is guided inside the inner lens to be emitted from the second inner lens surface, and is refracted at the second outer lens surface to be emitted.

4. The vehicular lamp according to claim 3, wherein
the second outer lens surface includes an inner surface that faces an inner side of the vehicular lamp, and an outer surface that faces an outer side of the vehicular lamp,
the inner surface of the portion located in the step shape includes an inner surface up-down-direction stretching portion that extends in the up-down direction of the vehicular lamp, and an inner surface bent portion that extends in the front-rear direction of the vehicular lamp,
the outer surface of the portion located in the step shape includes an outer surface up-down-direction stretching portion that extends in the up-down direction of the vehicular lamp, and an outer surface bent portion that extends in the front-rear direction of the vehicular lamp, and
when viewed in the front-rear direction, the inner surface up-down-direction stretching portion and the outer surface bent portion overlap, and the outer surface up-down-direction stretching portion and the inner surface bent portion overlap.

5. The vehicular lamp according to claim 1, wherein
the light source includes at least two light sources which are a first light source and a second light source, and
the first light source is located above the second light source, and has an emission light amount greater than that of the second light source.

6. The vehicular lamp according to claim 1, wherein
the vehicular lamp is a rear lamp that is provided at a rear part of a vehicle.

* * * * *